United States Patent [19]

Crane

[11] Patent Number: 4,565,926
[45] Date of Patent: Jan. 21, 1986

[54] METHOD AND APPARATUS FOR DETERMINING THE CONTENT AND DISTRIBUTION OF A THERMAL NEUTRON ABSORBING MATERIAL IN AN OBJECT

[75] Inventor: Thomas W. Crane, Los Alamos, N. Mex.

[73] Assignee: The United States of America as represented by the United States Department of Energy, Washington, D.C.

[21] Appl. No.: 564,125

[22] Filed: Dec. 21, 1983

[51] Int. Cl.⁴ .............................................. G01T 3/00
[52] U.S. Cl. ................................... 250/390; 376/159; 376/367
[58] Field of Search ........... 250/390 A, 390 C, 390 E, 250/390 I; 376/159, 367, 909

[56] References Cited

U.S. PATENT DOCUMENTS

| | | | |
|---|---|---|---|
| 2,613,325 | 10/1952 | Herzog | 250/391 |
| 3,577,158 | 5/1971 | Hahn | 250/356.2 |
| 3,809,885 | 5/1974 | Allen | 378/55 |
| 4,024,393 | 5/1977 | Braun et al. | 376/159 |
| 4,243,886 | 1/1981 | Untermyer, II | 376/159 |
| 4,365,159 | 12/1982 | Young | 250/385 |

OTHER PUBLICATIONS

H. O. Menlove, R. A. Forster, and D. B. Smith, "Power Reactor Fuel Assay System Employing Cf-252 Neutron Interrogation," Nuclear Safeguards Research and Development Program Status Report, Jan.-Apr. 1971, Los Alamos Scientific Laboratory Report LA-470-5-MS, pp. 6-8 (May 1971).

Primary Examiner—Alfred E. Smith
Attorney, Agent, or Firm—Lee Huffman; Paul D. Gaetjens; Judson R. Hightower

[57] ABSTRACT

The disclosure is directed to an apparatus and method for determining the content and distribution of a thermal neutron absorbing material within an object. Neutrons having an energy higher than thermal neutrons are generated and thermalized. The thermal neutrons are detected and counted. The object is placed between the neutron generator and the neutron detector. The reduction in the neutron flux corresponds to the amount of thermal neutron absorbing material in the object. The object is advanced past the neutron generator and neutron detector to obtain neutron flux data for each segment of the object. The object may comprise a space reactor heat pipe and the thermal neutron absorbing material may comprise lithium.

18 Claims, 7 Drawing Figures

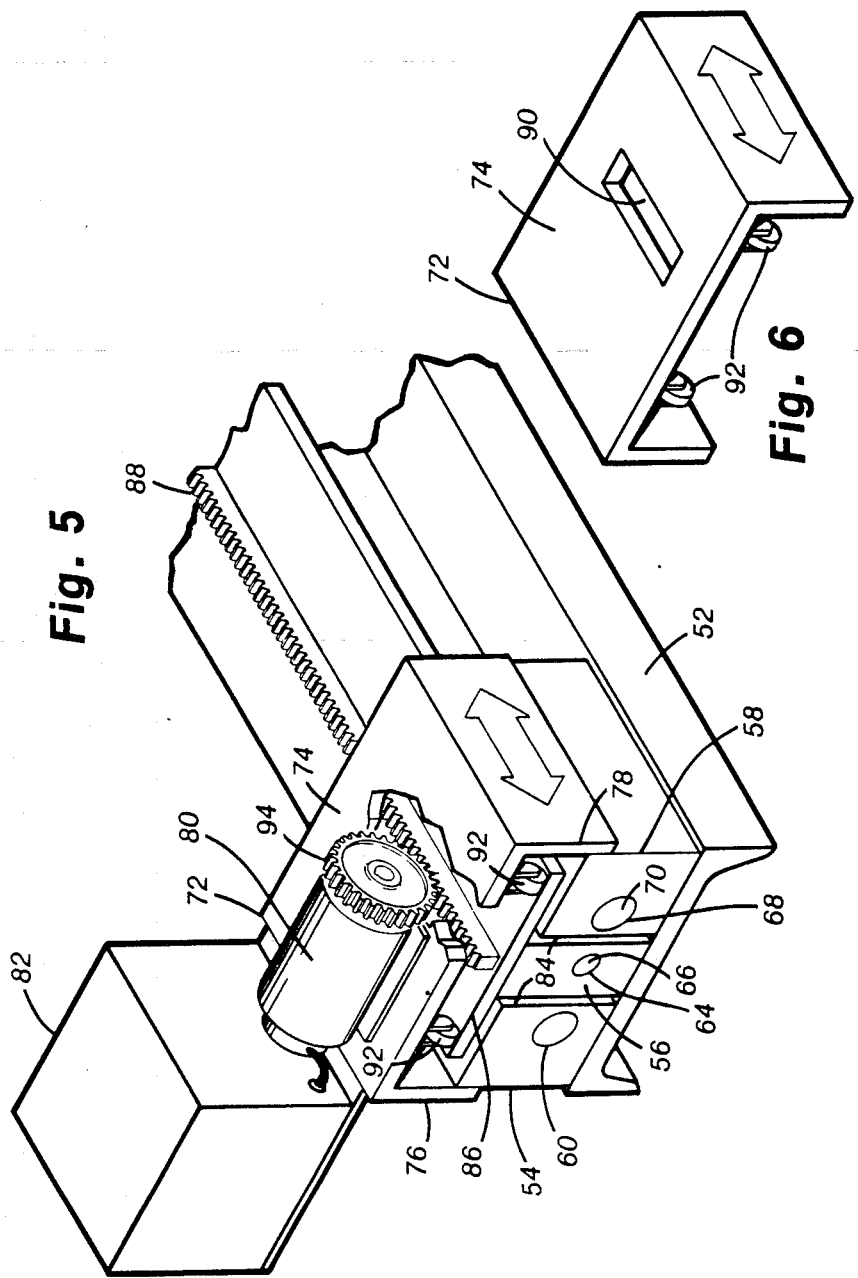

METHOD AND APPARATUS FOR DETERMINING THE CONTENT AND DISTRIBUTION OF A THERMAL NEUTRON ABSORBING MATERIAL IN AN OBJECT

This invention is the result of a contract with the Department of Energy (Contract No. W-7405-ENG-36).

BACKGROUND OF THE INVENTION

The invention described herein relates generally to structures and a method for determining the content and distribution of a thermal neutron absorbing material within an object and more particularly to structures and a method for determining the lithium content and distribution within a space reactor heat pipe.

It is useful to know whether the chemical composition of an object varies or is uniform. Using x-rays to make this determination is not always satisfactory. The present invention provides for determining the content and distribution of a thermal neutron absorbing material within an object. The present invention is also concerned with determining the content and distribution of a thermal neutron absorbing working fluid, and lithium in particular, within a space reactor heat pipe.

A space reactor heat pipe is designed to transfer heat energy from a space reactor. The heat can be transferred to power conversion equipment. The heat generated by the reactor can be converted to electricity which is used to power satellites or deep space vehicles. In such applications, the reliability of the heat pipe is critical.

A heat pipe is a closed chamber containing a wick that is saturated with a volatile working fluid. Heat is applied to an evaporator section of the pipe, causing the working fluid to evaporate and move to a condenser section of the pipe, where the vapor condenses and heat is transferred from the pipe. The condensed fluid then returns along the wick by capillary action to the evaporator section.

Heat pipes can have several thousand times the heat transfer capability of the most conductive metals. The ability of a heat pipe to transfer heat can be increased by including an artery with the wick. The artery has a radius greater than the pores in the wick. This increased radius permits a greater flow rate for the condensed fluid.

The ability of a heat pipe to efficiently transfer heat partly depends on the surface tension of the working fluid. If there are gaps in the working fluid in the wick or artery, the pressure difference available to drive the return of the working fluid from the condenser section to the evaporator section of the heat pipe will be greatly reduced. Consequently, it is important to ensure that the heat pipe is uniformly loaded with a working fluid.

Lithium is commonly employed as the working fluid in heat pipes. It is not practical to determine the lithium distribution using x-rays. The lithium is too light and too thin compared to the space reactor heat pipe, which is typically made of molybdenum.

One known method of determining the lithium distribution within a space reactor heat pipe involves neutron radiography, using neutrons emitted from a nuclear reactor. Neutron radiographs have excellent resolution and provide information on the relative lithium distribution, but they do not show exactly how much lithium there is in each segment of the heat pipe. There are other disadvantages to using neutron radiography. For example, the heat pipe must be transported to a conventional nuclear reactor. It is possible for the heat pipe to be damaged on the return trip and such damage would not be revealed by the radiograph. A long exposure to the reactor is required and this entire procedure is expensive. Also, the radiograph only provides information on the lithium distribution before the heat pipe is used. If problems occur during testing of the heat pipe, the lithium distribution can not be checked while the heat pipe is in operation. The heat pipe must be sent back to the conventional reactor to determine whether there is a problem with the lithium.

U.S. Pat. No. 3,577,158 to Hahn discloses an apparatus and method for measuring the mass flow rate of a fluid having a high scattering cross section for neutrons having an energy higher than that of thermal neutrons. In this device many of the higher energy neutrons are slowed to lower energies by a fluid flowing in a conduit. Hahn also discloses a detector to detect the lower energy neutrons. The Hahn device and method of utilizing it are distinguishable from the present invention in several ways. The Hahn device determines the mass flow rate of a fluid. The present invention determines the content and distribution of a thermal neutron absorbing material within an object. More importantly, the Hahn device measures a property of a fluid having a high scattering cross section for higher energy neutrons, whereas the present invention measures the location and amount of a material that absorbs thermal neutrons. Both devices rely on the detection of thermal neutrons, but the Hahn device relies on the number of higher energy neutrons that are thermalized and the present invention relies on the number of thermal neutrons absorbed by a material.

SUMMARY OF THE INVENTION

One object of the present invention is to provide a method and apparatus for accurately measuring the content and distribution of a thermal neutron absorbing material within an object.

Another object of the invention is to quickly and inexpensively determine the content and distribution of a thermal neutron absorbing working fluid within a space reactor heat pipe.

Still another object of the invention is to provide for the on-site determination of the content and distribution of lithium within a space reactor heat pipe.

Another object of the invention is to provide for the determination of the content and distribution of lithium within an operating space reactor heat pipe.

To achieve the foregoing and other objects, and in accordance with the purposes of the present invention, as embodied and broadly described herein, there is provided an apparatus and method for determining the content and distribution of a thermal neutron absorbing material within an object. The apparatus comprises a source such as a $^{252}$Cf neutron source for generating neutrons having an energy higher than that of thermal neutrons, a material for thermalizing the high energy neutrons, the thermalizing material being disposed between the neutron generating source and the object, and a thermal neutron detector for counting thermal neutrons. An active portion of the neutron detector is centrally disposed within the neutron detector and in substantial alignment with the neutron generating source. A shield comprising an effective thermal neutron absorbing material is interposed between the object and the neutron detector. The shield has portions defining an orifice and the orifice is disposed in substantial alignment between the active portion and the neutron generating source. The orifice may be substantially coextensive with the active portion and the neutron detector may be position-sensitive. The thermal neutron absorbing material can be lithium and the object can be a space reactor heat pipe. The neutron detector can be disposed within a detector housing having portions defining a detector cavity. The neutron generating source can be disposed within a source housing having portions defining a source cavity. The neutron thermalizing material can have portions defining a thermalizing cavity in which the space reactor heat pipe is disposed. A support structure can be positioned below the source housing and detector housing. A drive apron can be connected to the source housing and detector housing. A drive device can be connected to the drive apron to move the drive apron, source housing and detector housing relative to the neutron thermalizing material and space reactor heat pipe. A control device can be connected to the drive device to control its movement. The neutron thermalizing material can comprise water to cool the neutron detector.

In practicing the method of the invention, neutrons having an energy higher than that of thermal neutrons are generated, thermalized, and passed through an object. The thermal neutrons that pass through the object during a first time period are detected and counted. This number is compared to the number of thermal neutrons detected and counted during a second time period when the object is removed from the path of the neutrons.

The determination of the lithium content and distribution within a space reactor heat pipe is achieved by detecting and counting the thermal neutrons which pass through the lithium during a first preselected time period and comparing this neutron flux with the neutron flux during a second preselected time period when the space reactor heat pipe is located outside of the path of the thermal neutrons. The neutron generating source and the thermal neutron detector are then moved a preselected distance from one segment of the space reactor heat pipe to the next adjacent segment and neutron flux measurements are made. The neutron generating source and the thermal neutron detector are moved again until neutron flux data is obtained for each segment of the space reactor heat pipe.

The apparatus in accordance with the present invention allows the lithium content and distribution of an operating heat pipe to be checked on site. There is no need to transport the heat pipe to a conventional reactor, as is required by the neutron radiography technique, and the attendant delay, expense and risk of damage to the pipe are eliminated. Also, the lithium content and distribution can be determined without delay after modifications or testing. Furthermore, the present invention provides an excellent measurement of the lithium thickness. Since the lithium layer is thin compared to the thickness that the thermal neutrons can penetrate, the neutron flux data obtained provides an accurate indication of the thickness of the lithium.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 3 shows a shield usable in the FIG. 1 embodiment of the invention.

FIG. 5 depicts yet another embodiment of the invention in partial fragmentary view.

FIG. 6 shows a drive apron usable in the FIG. 5 embodiment of the invention;

FIG. 7 shows a plan view in cross section of portions of the embodiment shown in FIG. 1, taken along section lines 7—7 of FIG. 1.

DETAILED DESCRIPTION OF THE INVENTION

Figure 1:
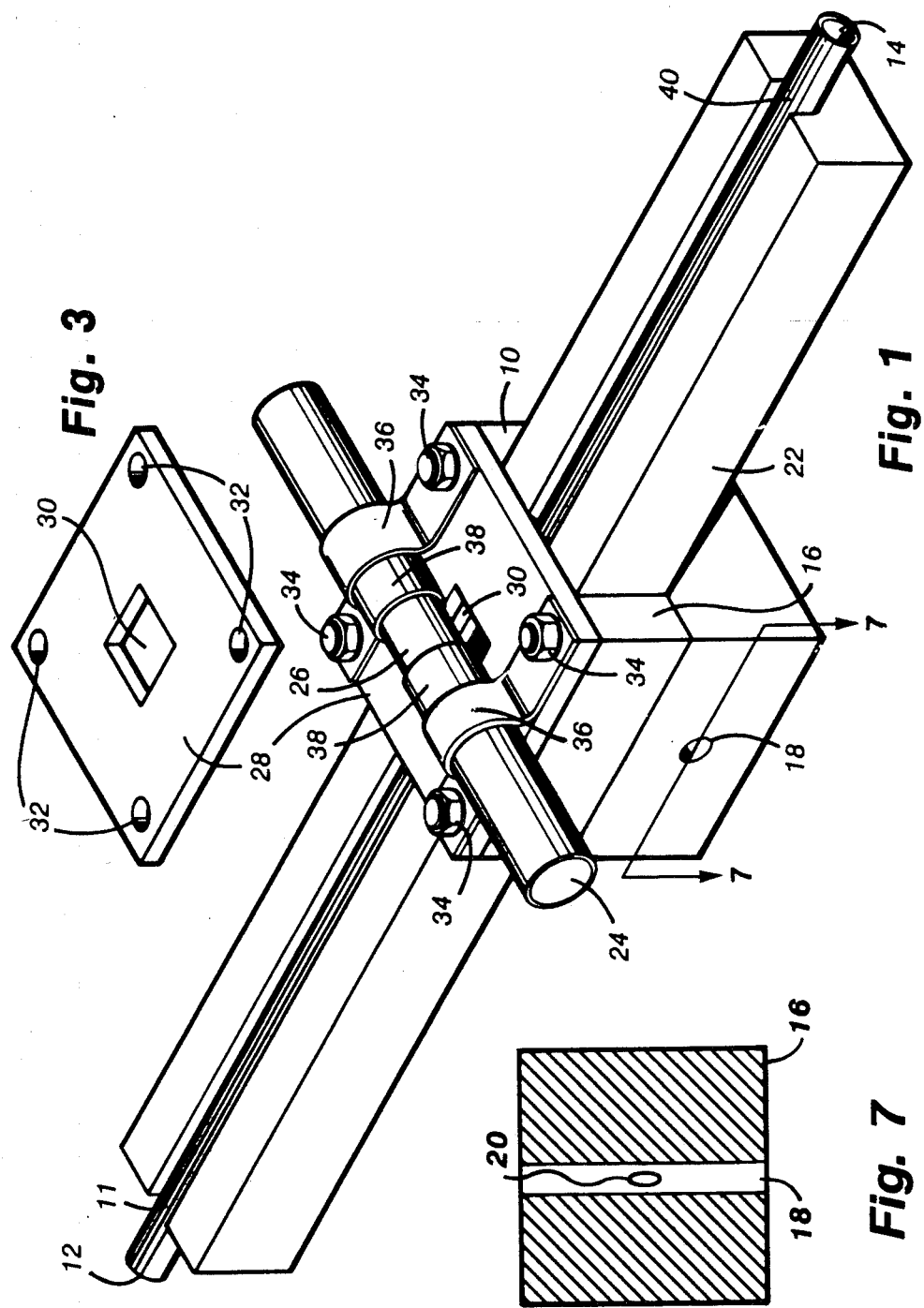
FIG. 1 shows a preferred embodiment of the invention.

Reference is now made to FIG. 1 which shows a preferred embodiment of the invention. An apparatus 10 is shown for determining the content and distribution of a thermal neutron absorbing material within an object 11, having a first end 12 and a second end 14, and which is sufficiently thin that an adequate neutron count rate can be obtained. The object 11 can be cylindrical as shown, but its particular shape is not essential to the invention and it will be appreciated by those skilled in the art that a sufficiently thin object 11 of any shape can be used. Thermal neutron absorbing materials include at least the following elements listed in the Table. The Table is based on data given in U.S. Atomic Energy Commission Regulatory Guide 5.11, October 1973.

TABLE

| Naturally Occurring Element | Absorption Cross Section | Naturally Occurring Element | Absorption Cross Section In Barns for Thermal Neutrons |
|---|---|---|---|
| Gadolinium | 46,000 | Terbium | 46 |
| Samarium | 5,600 | Cobalt | 38 |
| Europium | 4,300 | Ytterbium | 37 |
| Cadmium | 2,450 | Chlorine | 34 |
| Dysprosium | 950 | Cesium | 28 |
| Boron | 755 | Scandium | 24 |
| Actinium | 510 | Tantalum | 21 |
| Iridium | 440 | Radium | 20 |
| Mercury | 380 | Tungsten | 19 |
| Protactinium | 200 | Osmium | 15 |
| Indium | 191 | Manganese | 13 |
| Erbium | 173 | Selenium | 12 |
| Rhodium | 149 | Promethium | 11 |
| Thulium | 127 | Lanthanum | 9 |
| Lutetium | 112 | Thorium | 8 |
| Hafnium | 105 | Iodine | 7 |
| Rhenium | 86 | Antimony | 6 |
| Lithium | 71 | Vanadium | 5 |
| Holmium | 65 | Tellurium | 5 |
| Neodymium | 46 | Nickel | 5 |

The apparatus may include a platform 16 having portions defining a cylindrical platform cavity 18. The platform 16 may be made of aluminum. A neutron generating source 20, shown in FIG. 7, is located in the cavity 18. The source 20 generates neutrons having an energy higher than that of thermal neutrons. Preferably the neutron generating source 20 comprises a $^{252}$Cf neutron source, which consists of a sub-microgram quantity of $^{252}$Cf contained in a stainless steel capsule. The higher energy neutrons are thermalized by a neutron thermalizing material 22 which is located between the neutron generating source 20 and the object 11. Preferably the neutron thermalizing material 22 comprises polyethylene. The optimum thickness of the polyethylene is about 3.8 cm, but thickness of about 1 cm to about 15 cm will also effectively thermalize neutrons. A neutron detector 24 for counting thermal neutrons is positioned above the object 11. Preferably the neutron detector 24 is a $^3$He neutron detector. There is provided an active portion 26 which is centrally disposed within the neutron detector 24 and is substantially aligned over the neutron generating source 20. A shield 28 is provided between the object 11 and the neutron detector 24. The shield 28 comprises an effective thermal neutron absorbing material such as cadmium or boron. An effective thermal neutron absorbing material has a high absorption cross section for thermal neutrons. The shield 28 has portions defining an orifice 30 which is disposed in substantial alignment between the neutron generating source 20 and the active portion 26. The orifice 30 can be substantially coextensive with the active portion 26. As shown in FIG. 3, the shield 28 can include slots 32. The orifice 30 is more clearly shown in FIG. 3. Referring again to FIG. 1, bolts 34 or any conventional attachment devices can be used to secure coupling members 36 to the shield 28. The coupling members 36 hold the neutron detector 24 in place over the orifice 30. The shield 28 can include portions 38 covering all but the active portion 26 of the neutron detector 24. In operation, higher energy neutrons are generated by the neutron generating source 20. The higher energy neutrons are thermalized by the neutron thermalizing material 22. Some of the thermal neutrons are absorbed by the thermal neutron absorbing material in the object 11. The thermal neutrons which pass through the object 11 during a first time period are detected and counted by neutron detector 24. During a second time period when the object 11 is absent from the path of the thermal neutrons, the number of thermal neutrons is detected and counted. By comparing the neutron flux during the first and second time periods, the number of thermal neutrons absorbed per unit time by the object 11 can be calculated. This number indicates the amount of the thermal neutron absorbing material present in the segment of the object 11 which is under the active portion 26. The object 11 is then advanced and the neutron flux during a first time period is measured. This procedure is repeated for each segment of the object 11 from its first end 12 to its second end 14. The object 11 is preferably a space reactor heat pipe and the thermal neutron absorbing material therein is preferably lithium. Where the object 11 is a space reactor heat pipe, the neutron thermalizing material preferably comprises a layer of polyethylene having portions defining a longitudinal groove 40 in which the space reactor heat pipe is disposed.

Figure 2:
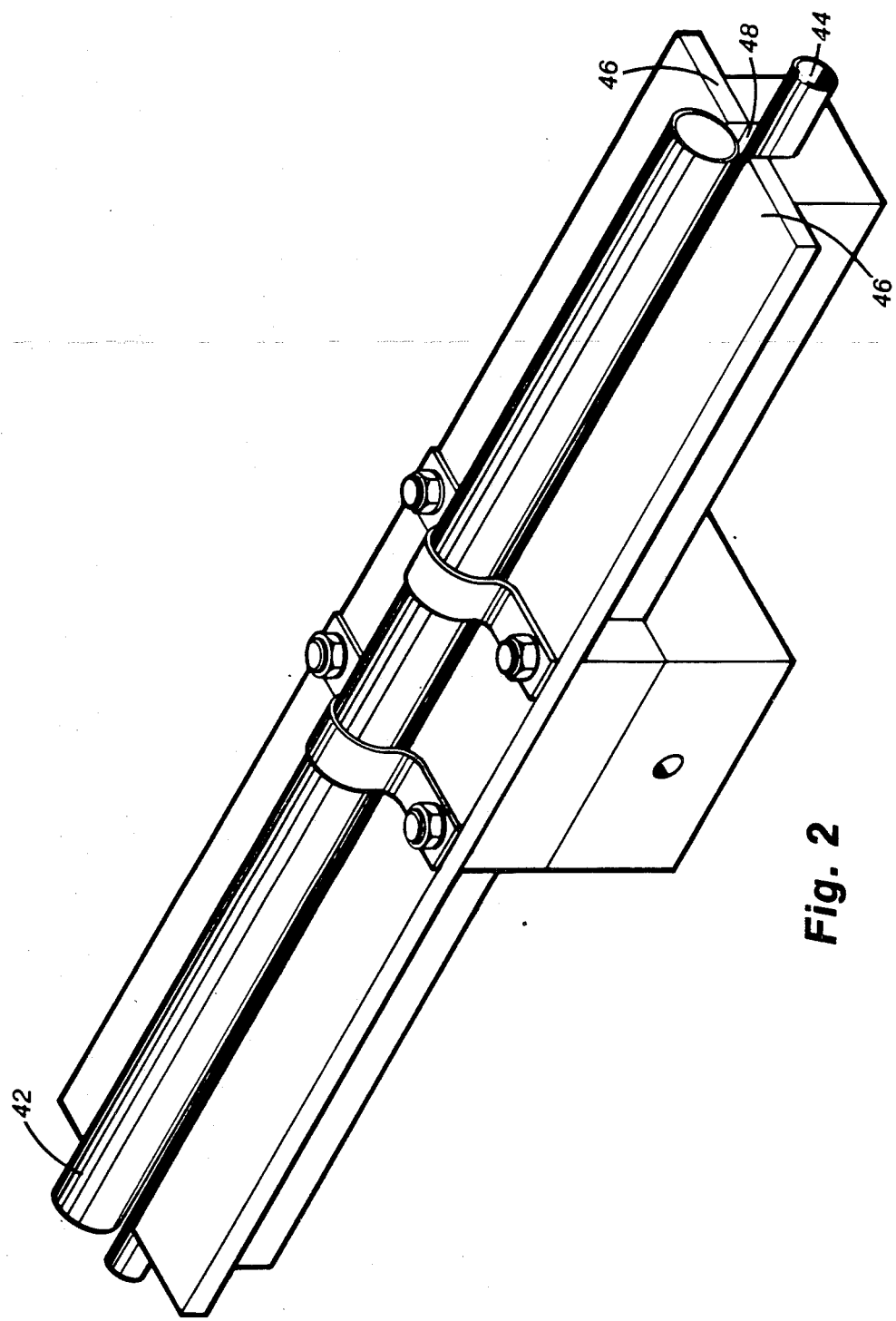
FIG. 2 illustrates another embodiment of the invention.

FIG. 2 illustrates another embodiment of the invention. The difference between the FIG. 2 embodiment and that of FIG. 1 is that in FIG. 2 the neutron detector 42 is parallel to and substantially coextensive with the object 44. The neutron detector 42 is position-sensitive. Consequently, the object does not have to be moved to determine the distribution of the thermal neutron absorbing material therein. The position sensitive neutron detector 42 has better resolution and makes more efficient use of the source neutrons. Preferably there will be a plurality of sources disposed under the object 44 and in substantial alignment with the neutron detector 42. Another difference is that the shield 46 can comprise two separate portions so that the orifice 48 defined thereby and neutron detector 42 are substantially coextensive.

Figure 4:
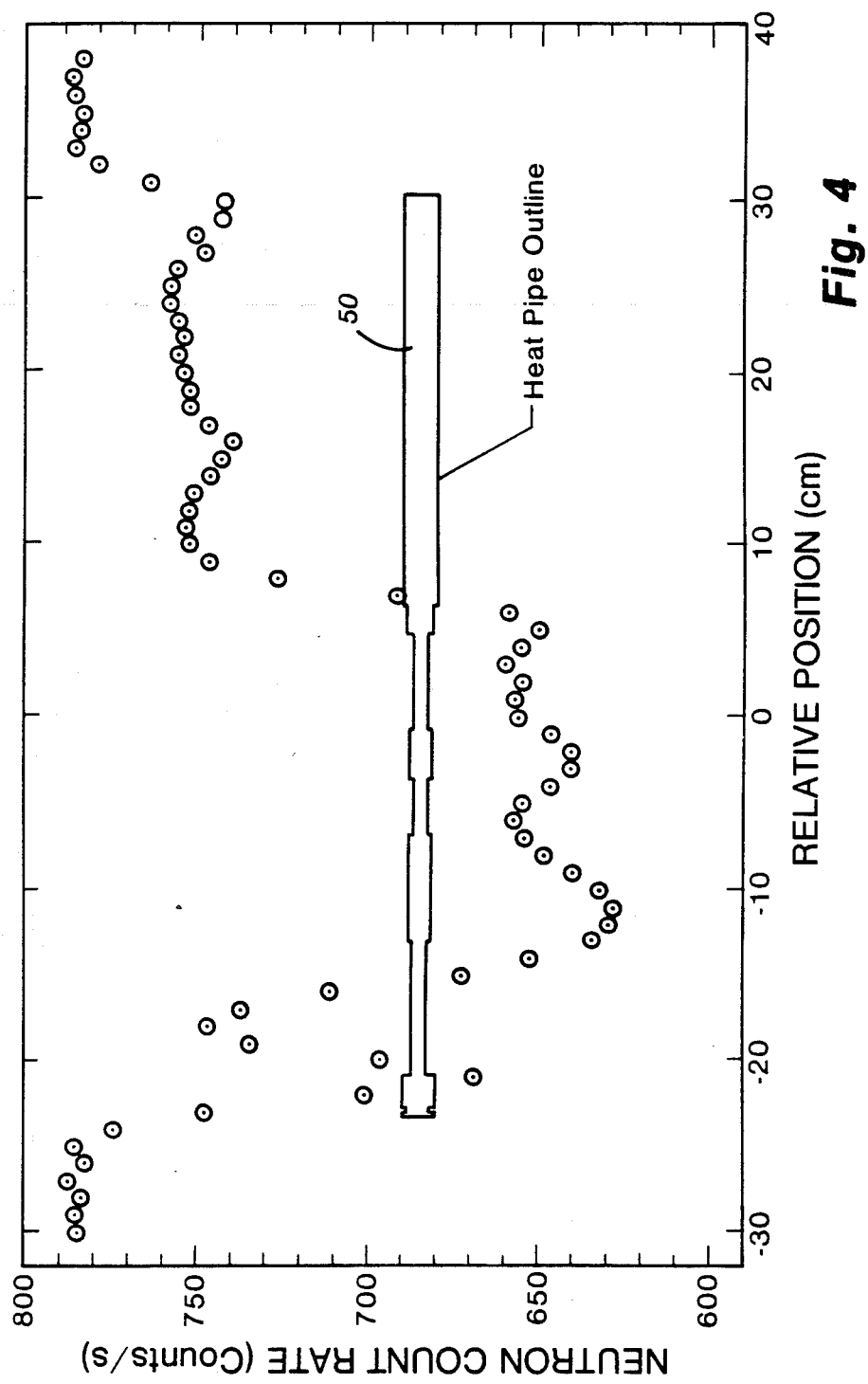
FIG. 4 graphically illustrates the varying neutron count rate detected at different positions along a space reactor heat pipe.

FIG. 4 graphically illustrates the varying neutron count rates detected at different positions along a space reactor heat pipe 50 using the apparatus depicted in FIG. 1. The space reactor heat pipe 50 was loaded with lithium. The neutron generating source 20 used was a $^{252}$Cf source. It was an Isotope Products Laboratory CR-6 source. The source was from the Savannah River plant and was designated SR-CF-100. The neutron detector 24 used was a $^3$He detector from Reuter Stokes with model number RS-P4-0804-225. The space reactor heat pipe 50 was advanced one centimeter every one hundred seconds. As can be seen in FIG. 4, the neutron count rate along the length of the pipe varied from about 620 counts per second to about 760 counts per second. Outside of the space reactor heat pipe 50, where there was no lithium to absorb thermal neutrons, the count rate was about 780 to 790. The decrease in the neutron count rate provides the basis for calculating the amount of lithium in each segment of the space reactor heat pipe 50. The neutron count rate can be calibrated in terms of a known lithium thickness. A sub-microgram $^{252}$Cf source was used, but a larger source could have been used. Using a larger source involves greater potential radiation hazards. Neutrons could have been detected and counted for a longer or shorter time than one hundred seconds. Decreasing the count time by a factor of ten would result in an approximate three-fold decrease in precision. A significantly thicker layer of lithium would require a longer count time to provide the same precision.

FIG. 5 illustrates another embodiment of the invention having a support structure 52, a source housing 54, a neutron thermalizing material 56 and a detector housing 58. The source housing 54 has portions defining a cylindrical source cavity 60 in which a neutron generating source (not shown in this Figure) is disposed. The neutron thermalizing material 56 has portions defining a thermalizing cavity 64 in which a space reactor heat pipe 66 is disposed. The space reactor heat pipe contains lithium. The detector housing 58 has portions defining a detector cavity 68 in which a neutron detector 70 is disposed. A drive apron 72 is provided which has a main portion 74 positioned above the source housing 54 and the detector housing 58. The drive apron 72 is shown in fragmentary view and includes a first side portion 76 connected to the source housing 54 and a second side portion 78 connected to the detector housing 58. A drive mechanism 80 such as a drive motor is operably connected to the drive apron 72 for moving the drive apron 72, source housing 54 and detector housing 58 a preselected distance along the length of the space reactor heat pipe 66. A control device 82 is operably connected to the drive mechanism 80 to control its movement. The neutron thermalizing material 56 preferably comprises a hydrogenous liquid such as water for cooling the neutron detector 70. A heat shield 84 can be disposed about the neutron thermalizing material 56. A base 86 can be positioned above the neutron thermalizing material 56. A gear rack 88 can be located on the base 86 and beneath the main portion 74 of the drive apron 72. Preferably the base 86 and gear rack 88 are substantially longitudinally coextensive with the neutron thermalizing material 56. FIG. 6 shows the drive apron 72 separate from the apparatus of FIG. 5. The main portion 74 of the drive apron 72 has portions defining a drive orifice 90 which, as shown in FIG. 5, is in substantial alignment over the gear rack 88. Referring again to FIG. 6, the drive apron 72 can include glide members 92 which, as shown in FIG. 5, contact the base 86. The drive mechanism 80 preferably includes an engaging structure 92 such as a gear wheel for advancing the drive apron 72 along the gear rack 88.

The foregoing description of several embodiments of the invention has been presented for purposes of illustration and description. It is not intended to be exhaustive or to limit the invention to the precise forms disclosed. They were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for determining the content and distribution of a thermal neutron absorbing material within an object, said apparatus comprising:
   a. means for generating neutrons having an energy higher than thermal neutrons;
   b. means for thermalizing said higher energy neutrons, said neutron thermalizing means being disposed between said neutron generating means and the object;
   c. neutron detecting means for counting thermal neutrons, said neutrons detecting means including an active portion, said active portion being centrally disposed within said neutron detecting means and in substantial alignment with said neutron generating means; and
   d. shield means interposed between the object and said neutron detecting means, said shield means comprising an effective thermal neutron absorbing material and having portions defining an orifice, said orifice disposed in substantial alignment between said active portion and said neutron generating means, whereby the number of neutrons absorbed by the object per unit time is determined by comparing the neutron flux at said neutron detecting means when the object is located between said neutron thermalizing means and said shield means with the neutron flux when the object is absent.

2. The apparatus of claim 1 wherein said orifice is substantially coextensive with said active portion.

3. The apparatus of claim 2 wherein said neutron detecting means comprises a position-sensitive detector.

4. The apparatus of claim 1 wherein said neutron generating means comprises a $^{252}Cf$ neutron source.

5. The apparatus of claim 1 wherein said neutron thermalizing means comprises polyethylene.

6. The apparatus of claim 1 wherein said neutron detecting means comprises a $^3He$ detector.

7. The apparatus of claim 1 wherein said shield means includes portions covering all but the active portion of said neutron detecting means.

8. The apparatus of claim 1 wherein the object comprises a space reactor heat pipe and the thermal neutron absorbing material comprises lithium.

9. The apparatus of claim 8 wherein said neutron thermalizing means comprises a layer of polyethylene having portions defining a longitudinal groove in which the space reactor heat pipe is disposed.

10. The apparatus of claim 8 wherein said neutron thermalizing means includes portions defining a thermalizing cavity in which the space reactor heat pipe is disposed.

11. The apparatus of claim 10 further comprising:
    a. a support structure;
    b. a source housing having portions defining a source cavity in which said neutron generating means is disposed, said source housing being disposed above said support structure;
    c. a detector housing having portions defining a detector cavity in which said neutron detecting means is disposed, said detector housing being disposed above said support structure;
    d. a drive apron connected to said source housing and to said detector housing, said drive apron having a main portion positioned above said source housing and above said detector housing;
    e. drive means connected to said drive apron for moving said drive apron, said source housing and said detector housing a preselected distance relative to said neutron thermalizing means after a preselected period of time has elapsed, whereby neutron flux data is obtained for each segment of the space reactor heat pipe as said drive apron, said source housing and said detector housing are moved along the length of the space reactor heat pipe; and
    f. control means connected to said drive means for controlling the movement of said drive means.

12. The apparatus of claim 11 wherein said neutron thermalizing means comprises a hydrogenous liquid for cooling the neutron detector.

13. The apparatus of claim 12 further comprising a heat shield disposed around said neutron thermalizing means.

14. The apparatus of claim 12 wherein said hydrogenous liquid comprises water.

15. The apparatus of claim 11 further comprising:
    a base disposed above said neutron thermalizing means and beneath said main portion of said drive apron; and
    a gear rack located on said base and beneath said main portion of said drive apron, said base and said gear rack being substantially longitudinally coextensive with said neutron thermalizing means.

16. The apparatus of claim 15 wherein said drive apron includes portions defining a drive orifice, said drive orifice being in substantial alignment above said gear rack.

17. The apparatus of claim 16 wherein said drive means includes means for engaging said gear rack.

18. A method of determining the lithium content and distribution within a space reactor heat pipe having a first end and a second end comprising the steps of:
    a. locating the space reactor heat pipe between a neutron thermalizing material and a device for detecting and counting thermal neutrons;

b. locating a source for generating neutrons having an energy higher than thermal neutrons adjacent to the neutron thermalizing material;
c. thermalizing the higher energy neutrons;
d. detecting and counting the thermal neutrons which pass through the lithium in the space reactor heat pipe during a first preselected time period;
e. then moving the neutron generating source and the neutron detecting and counting device a preselected distance from one segment of the space reactor heat pipe to the next adjacent segment of the space reactor heat pipe;
f. repeating steps (d) and (e) until the neutron generating source and the neutron detecting and counting device have been moved from the first end of the space reactor heat pipe to its second end;
g. locating the space reactor heat pipe outside of the path of the thermal neutrons and detecting and counting thermal neutrons during a second preselected time period; and
h. calculating the number of thermal neutrons absorbed per unit time by the lithium in each segment of the space reactor heat pipe by comparing the neutron flux during the second preselected time period with the neutron flux during the first preselected time period for each segment of the space reactor heat pipe.

* * * * *